C. L. PEIRCE, Jr.

KEY HOLDER.

APPLICATION FILED AUG. 4, 1921.

Reissued Sept. 20, 1921. 15,200.

WITNESSES

J. Hobel Bradley

INVENTOR

Charles L. Peirce, Jr.

By Geo. H. McCallister

His Attorneys

UNITED STATES PATENT OFFICE.

CHARLES L. PEIRCE, JR., OF PITTSBURGH, PENNSYLVANIA.

KEY-HOLDER.

15,200. Specification of Reissued Letters Patent. Reissued Sept. 20, 1921.

Original No. 1,352,622, dated September 14, 1920, Serial No. 284,319, filed March 22, 1919. Application for reissue filed August 4, 1921. Serial No. 489,871.

*To all whom it may concern:*

Be it known that I, CHARLES L. PEIRCE, Jr., a citizen of the United States, and a resident of Pittsburgh, in the county of Allegheny and State of Pennsylvania, have made a new and useful Invention in Key-Holders, of which the following is a specification.

This invention relates to key holders and particularly to simplified key holders whereby any certain key of a number contained thereon may be readily distinguished one from another; said holder also being of such construction that any key may be removed from the holder without removing any of the other keys.

Generally speaking the key holder of my invention comprises a length of chain, or a plurality of links coupled together at the center of the key holder by a connector such as a sister hook, and dissimilar members at the opposite ends of the holder, functioning not only to retain the keys on the holder but as a means of readily distinguishing one end of the holder from the other thus providing means for readily determining the location of any certain key.

Figure 1:
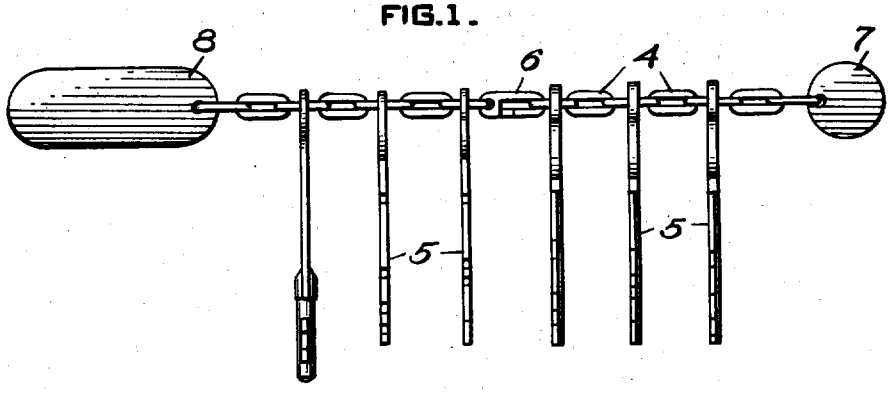
Figure 2:
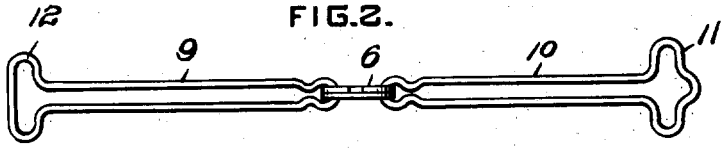
Figure 3:
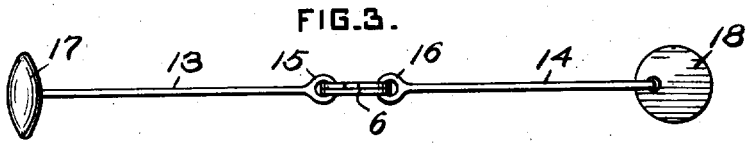
Figure 4:
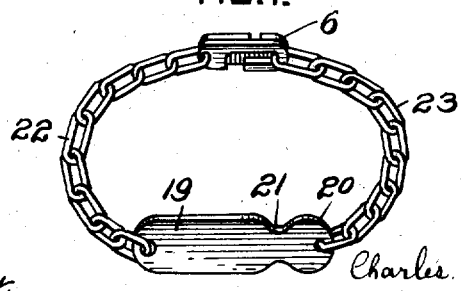

Various features of my invention will be clearly understood by reference to the accompanying drawings forming a part of the specification and in which Figure 1 is a view in side elevation of a key holder embodying this invention, Figs. 2 and 3 are similar views of modified forms of said holder and Fig. 4 is a view of a further modification of a key holder embodying certain features of this invention.

Referring to Fig. 1, the holder consists of a chain made up of a plurality of links 4 of the right size to readily slip through the eye of the keys 5 to be contained on the holder. The chain is divided in halves by means of a sister hook 6 which detachably connects the halves together and which may readily pass through the key eyes. The opposite ends of the chain are provided with dissimilar stops 7 and 8 which are of sufficient size to retain the keys on the holder and sufficiently dissimilar in either shape or size to be readily distinguished one from the other.

Referring to Fig. 2, the holder consists of two links 9 and 10 connected together by means of a sister hook 6. The dissimilar ends 11 and 12 forming stops for the holder in this form are made integral with links 9 and 10.

In the form shown in Fig. 3 the holder consists of two links 13 and 14 formed in the nature of bars having integral eyes 15 and 16 through which the sister hook 6 passes. In this form bar 13 is provided with an integral end stop 17 while bar link 14 is provided with a disk-like end 18 which serves as an end stop.

In the form shown in Fig. 4 the dissimilar end stops 19 and 20 are joined at 21 and the two series of links 22 and 23 forming key supports are joined together by means of a sister hook 6.

I am aware that numerous forms of key holders have been suggested in an attempt to produce one in which the keys thereon can be readily separated or isolated but so far as I am aware all of these have been more or less complicated and bulky and do not permit the removal of other keys. From my disclosure it will be readily apparent that if for instance an end key is to be removed the remaining keys can be slid along the holder to the end opposite from the key to be removed, the sister hook disconnected and the desired key removed and the sister hook again connected. By first sliding the keys until the one to be disconnected lies adjacent the sister hook it may be readily removed without disturbing the arrangement of any of the other keys or without removing the same. This is common to the three forms of device shown.

By means of the dissimilar end stops the location of any certain key may be readily determined for use without the necessity of seeing the key sought.

Having thus described my invention, what I claim is:—

1. A key holder comprising multiple links having a detachable connector for joining the links together, and means for identifying the opposite ends of the links.

2. A key holder comprising two key supports provided with dissimilar end stops, and a detachable connector joining said supports.

3. A key holder comprising two lengths of chain, a detachable connector for joining said lengths together, and dissimilar end stops for the opposite ends of the joined chains.

4. A key holder comprising two lengths of chain, a detachable connector for joining said lengths together and key stops for the opposite ends of the joined chain.

5. A key holder comprising two key supports provided with end stops and a detachable connector joining said supports.

In testimony whereof I have hereunto subscribed my name.

CHARLES L. PEIRCE, Jr.